United States Patent [19]

Dams

[11] 4,355,129

[45] Oct. 19, 1982

[54] ORGANOPOLYSILOXANE ELASTOMER-FORMING COMPOSITIONS

[75] Inventor: Michael J. Dams, Pontyclun, Wales

[73] Assignee: Dow Corning Limited, Barry, Wales

[21] Appl. No.: 253,414

[22] Filed: Apr. 13, 1981

[30] Foreign Application Priority Data

Apr. 16, 1980 [GB] United Kingdom ............... 8012461

[51] Int. Cl.³ .............................................. C08L 83/04
[52] U.S. Cl. ................................ 524/435; 106/288 B;
524/437; 524/789; 524/860
[58] Field of Search ............... 106/288 B; 260/37 SB;
524/435, 437, 789, 860

[56] References Cited

U.S. PATENT DOCUMENTS 4,269,757 5/1981 Mine et al. ..................... 260/37 SB Primary Examiner—Melvyn I. Marquis
Attorney, Agent, or Firm—Roger H. Borrousch

[57] ABSTRACT

A pigmented composition which is curable to a silicone rubber having improved color retention under conditions involving exposure to a corona discharge. The composition comprises (A) a curable polydiorganosiloxane, (B) a filler, (C) an organic peroxide curing agent and (D) a pigment which is an inorganic calcined complex containing Co and Al.

6 Claims, No Drawings

ORGANOPOLYSILOXANE ELASTOMER-FORMING COMPOSITIONS

This invention relates to novel pigmented elastomer-forming compositions which in the cured state have improved colour stability.

Organopolysiloxane elastomers are now widely employed in a variety of applications where good electrical properties and resistance to high temperatures are required, for example as seals for use in high temperature environments, as conduits for hot liquids, as sterilisable components for medical applications and as high and low voltage insulation. In connexion with the latter application in particular it is often desired to pigment the elastomer. For example, in a cable containing a number of individually insulated strands the insulating sheaths are often of different colour to assist in the identification of their different sources or functions.

A number of pigments are known which can be used to impart various colours to organopolysiloxane elastomers, and for most applications the choice of a suitable pigment does not present any serious difficulties. However, the conventional blue pigments for organopolysiloxane elastomers are not satisfactory for certain electrical applications. It has been found that, when employed under conditions involving exposure to a corona discharge, such pigmented elastomers quickly lose their colour.

According to this invention there is provided a composition which is curable to an organopolysiloxane elastomer and which comprises, (A) a polydiorganosiloxane convertible to the solid elastic state, wherein the organic substituents are selected from monovalent hydrocarbon groups and monovalent fluorinated organic groups, at least 40 percent of the total number of substituents being methyl groups, any groups having aliphatic unsaturation being present in a proportion of not more than 2 percent of the total number of substituents, the ratio of organic substituents to silicon atoms in the polydiorganosiloxane being in the range from 1.98 to 2.01, (B) a filler, (C) an organic peroxide curing agent, and (D) from 0.01 to 10 parts by weight per 100 parts by weight of (A) of a pigment which is an inorganic calcined complex containing Co and Al.

Also included within the scope of this invention is an organopolysiloxane elastomer which is the product obtained by curing the above-specified curable composition.

The convertible polydiorganosiloxane (A) employed in the compositions of this invention have a ratio of organic substituents to silicon atoms within the range from 1.98 to 2.01 and preferably in the range from 1.99 to 2.001. Such convertible polydiorganosiloxanes are well-known in the silicone rubber art and they may be homopolymers or copolymers and vary in consistency from high viscosity liquids to non-flowing gums. At least 40 percent of the total number of silicon-bonded organic substituents should be methyl groups, any remaining substituents being selected from other monovalent hydrocarbon groups and monovalent fluorinated hydrocarbon groups, preferably those having less than 10 carbon atoms. Most preferred are polydiorganosiloxanes wherein the organic substituents are methyl groups and, optionally, one or both of phenyl groups and vinyl groups. Examples of the operative polydiorganosiloxanes (A) are polydimethylsiloxanes, copolymers of dimethylsiloxane units and methylvinylsiloxane units, copolymers of dimethylsiloxane, diphenylsiloxane and trimethylsiloxane units, copolymers of dimethylsiloxane, methylphenylsiloxane and methylvinylsiloxane units, copolymers of dimethylsiloxane, methylphenylsiloxane and dimethylvinylsiloxane units and methyl (trifluoropropyl) polysiloxanes. When the polydiorganosiloxane contains vinyl or other aliphatically unsaturated groups as substituents such groups may constitute up to 2 percent and preferably less than 1 percent of the total number of substituents. Any phenyl groups present preferably constitute no more than about 5 percent of the total number of substituents.

The polydiorganosiloxane (A) may comprise a single polymeric species or, if desired, it may consist of two or more different species of polydiorganosiloxane. For example, it may comprise a polydimethylsiloxane free of vinyl groups, or with the vinyl groups attached to terminal silicon atoms, together with a polydimethylsiloxane having a proportion of vinyl groups attached to non-terminal silicon atoms.

Any suitable filler may be employed as component (B) of the compositions of this invention. A wide variety of fillers for organopolysiloxane elastomers are known including for example reinforcing and non-reinforcing silicas such as fume silica, precipitated silica, crushed quartz and diatomaceous earths, titanium dioxide, calcium carbonate, magnesium oxide and aluminium oxide. The choice of any particular fillers or combination of fillers will depend on such factors as the properties desired in the cured composition and cost. For most applications it is preferred that at least a part of component (B) is a reinforcing silica. Such silicas are well-known in the silicone rubber art and several types are available commercially. Preferably they have a surface area of at least 50 $m^2/g$ and can have surface areas of up to 300 $m^2/g$ or higher. They may be untreated, or they may be treated to modify their surface properties. Methods for modifying the surfaces of fillers employed in organopolysiloxane elastomers are well-known in the art and include the pretreatment or in situ treatment of the filler with a variety of organosilicon products, for example methyl chlorosilanes, vinyl alkoxysilanes, hydroxyl-containing methylsiloxanes and phenylsiloxanes, silanols e.g. diphenyl silanediol, cyclic siloxanes, silylamines and silazanes e.g. hexamethyldisilazane and tetramethyldivinyldisilazane. It is normally preferred that the treatment of the filler be carried out in situ, that is by incorporating the treating agent per se into the curable composition.

The proportion of the filler (B) present in the compositions is not critical and will in general be dictated by the physical properties such as hardness and tensile strength desired in the cured elastomer. The actual proportion employed can be determined in accordance with known practices and will usually fall within the range from 10 to 150 parts by weight per 100 parts by weight of the polydiorganosiloxane (A). When a reinforcing silica is present as part or the whole of the filler content it is preferably employed in a proportion of from 10 to 60 parts by weight per 100 parts by weight of (A).

As the curing agent (C) for the composition there may be employed any free radical generating organic peroxide compound. Such compounds include both peroxides and peroxy esters, for example benzoyl peroxide, ditertiary butyl peroxide, t-butyl cumyl peroxide, dicumyl peroxide, 2,4-dichlorobenzoyl peroxide, monochlorobenzoyl peroxide, tertiary butyl peracetate, tertiary butyl perbenzoate and 2,5-bis(tertiary butyl peroxy)-2,5-dimethylhexane. The organic peroxy vulcanising agent can be present in conventional amounts, that is from about 1 to 10 parts, preferably from 0.5 to 5 parts, by weight per 100 parts by weight of (A).

Component (D) of the elastomer-forming composition of this invention is a pigment which is an inorganic calcined complex containing Co and Al. Such pigments can be obtained as the reaction products of the high temperature calcination of cobalt and aluminium oxides and have the chemical formula $CoAl_2O_4$. This component is incorporated into the elastomer forming composition in a proportion of from 0.01 to 10 parts by weight, preferably from 0.25 to 2.5 parts by weight, per 100 parts by weight of the polydiorganosiloxane (A).

In addition to components (A) to (D) specified hereinabove the compositions of this invention may contain other ingredients for producing specific effects and properties. Examples of such additional ingredients are heat stability additives e.g. rare earth oxides and hydroxides, processing aids and additives for improving the electrical properties of the elastomer. When the compositions are destined for use as high voltage insulating materials a preferred additive is alumina trihydrate employed in a proportion of from about 40 to about 160 parts by weight per 100 parts by weight of the polydiorganosiloxane (A).

The elastomer-forming compositions of this invention can be prepared by conventional silicone rubber compounding techniques, for example by mixing on a two roll mill or in a dough mixer. The pigment (D) may be added as a fine powder or more conveniently as a masterbatch (mixture) with a silicone polymer. In accordance with known practices the compositions can be cured to elastomers by exposure to elevated temperatures to activate the curing agent.

The compositions of this invention are particularly suitable for use in the fabrication of articles which may be subjected to the effect of electrical surface discharges and where resistance to change in the electrical and physical properties is desired. One example of such an application is in the construction of high voltage insulators of the kind comprising silicone rubber sheds mounted on a central rod, usually of resin-bonded fibreglass. Other examples include the construction of high voltage cable terminations, as core and sheath insulation for high voltage cable, and in the fabrication of insulating tapes and sleeves for jointing high voltage cables.

The following example, in which the parts are expressed by weight, illustrates the invention.

EXAMPLE

The following ingredients were mixed together on a two roll mill employing conventional rubber compounding procedures:

| | |
|---|---|
| Polydimethylsiloxane gum having on average about 2 vinyl groups per molecule | 100 parts |
| Fume Silica | 38 parts |
| Alumina trihydrate | 125 parts |
| Cobalt aluminate blue pigment (Blythe DC 4365) | 1.1 parts |
| 2,5 bis (tertiary butyl peroxy)-2-5 dimethylhexane (50% dispersion) | 0.7 parts |

The compound stock was removed from the mill, moulded into test slabs and cured in the press at 171° C. for 10 minutes. When the cured elastomer was exposed to a corona discharge for 32 hours at 15 kV, 50 Hz, rod/plane electrodes (IEC method 343) it retained its colour. An identically-formulated elastomer, except that it contained a conventional blue pigment (Blythe DC 5272 ultramarine), showed colour fading in the region of the corona discharge when subjected to a similar test.

When the peroxy hexane curing agent was replaced with 0.75 part of 2,4-dichlorobenzoyl peroxide a pigmented composition was obtained which was curable by exposure to hot air at about 250°–300° C.

That which is claimed is:
1. A composition curable to an organopolysiloxane elastomer and which comprises (A) a polydiorganosiloxane convertible to the solid elastic state wherein the organic substituents are selected from monovalent hydrocarbon groups and monovalent fluorinated organic groups, at least 40 percent of the total number of substituents being methyl groups any groups having aliphatic unsaturation being present in a proportion of not more than 2 percent of the total number of substituents, the ratio of organic substituents to silicon atoms in the polydiorganosiloxane being in the range from 1.98 to 2.01, (B) a filler, (C) an organic peroxide curing agent, and (D) from 0.01 to 10 parts by weight per 100 parts by weight of (A) of a pigment which is an inorganic calcined complex oxide containing Co and Al.

2. A composition as claimed in claim 1 wherein the organic substituents in the polydiorganosiloxane (A) are selected from methyl, phenyl and vinyl groups.

3. A composition as claimed in claim 1 or claim 2 wherein the filler comprises from 10 to 60 parts by weight per 100 parts by weight of (A) of a reinforcing silica.

4. A composition as claimed in claims 1 or 2 which also contains alumina trihydrate.

5. A silicone rubber which is the product obtained by curing the composition claimed in claim 1.

6. A composition as claimed in claims 1 or 2 wherein the filler comprises from 10 to 60 parts by weight per 100 parts by weight of (A) of a reinforcing silica, and also contains alumina trihydrate.

* * * * *